US010836293B2

(12) United States Patent
Stroud et al.

(10) Patent No.: US 10,836,293 B2
(45) Date of Patent: Nov. 17, 2020

(54) COLOR CODED TRIM-TO-FIT MAT

(71) Applicant: ADC Solutions Auto, LLC, Costa Mesa, CA (US)

(72) Inventors: Annette Marie Stroud, Chattanooga, TN (US); Diner Mondragón, Dalton, GA (US)

(73) Assignee: ADC Solutions Auto, LLC, Costa Mesa, CA (US)

( * ) Notice: Subject to any disclaimer, the term of this patent is extended or adjusted under 35 U.S.C. 154(b) by 0 days.

(21) Appl. No.: 15/933,421

(22) Filed: Mar. 23, 2018

(65) Prior Publication Data

US 2020/0094721 A1    Mar. 26, 2020

Related U.S. Application Data

(60) Provisional application No. 62/477,497, filed on Mar. 28, 2017.

(51) Int. Cl.
*B60N 3/04*    (2006.01)

(52) U.S. Cl.
CPC .................................. *B60N 3/048* (2013.01)

(58) Field of Classification Search
CPC ....................................................... B60N 3/048
USPC ............................................................ 428/95
See application file for complete search history.

(56) References Cited

U.S. PATENT DOCUMENTS

| | | |
|---|---|---|
| 8,080,302 B2 | 12/2011 | Gifford |
| 8,277,918 B1 | 10/2012 | Gifford |
| 8,455,078 B2 | 6/2013 | Gifford |
| 8,685,516 B2 | 4/2014 | Gifford |
| 8,778,480 B2 | 7/2014 | Bouchard |
| 9,254,771 B2 | 2/2016 | Brown |
| 2003/0143358 A1 | 7/2003 | Needles |
| 2010/0075093 A1* | 3/2010 | Gifford .................. B60N 3/044 428/43 |

* cited by examiner

*Primary Examiner* — Brent T O'Hern
(74) *Attorney, Agent, or Firm* — Robert D. Buyan; Stout, Uxa & Buyan, LLP

(57) ABSTRACT

An automobile mat has a plurality of differently colored guidelines applied to one of both of its top surface and bottom surface, each to aid in the cutting there-along to create a mat periphery shaped and sized to properly fit one of a similar plurality of vehicle models.

13 Claims, 7 Drawing Sheets
(3 of 7 Drawing Sheet(s) Filed in Color)

COLOR CODED TRIM-TO-FIT MAT

RELATED APPLICATIONS

This application claims all entitled Priority to U.S. Provisional Application No. 62/4,277,497 filed on 28 Mar. 2017, the entire teachings of which are incorporated herein by reference.

FIELD OF THE INVENTION

The present invention is related to floor mats for use in automobiles. More specifically, the invention is related to universal mats intended to be used in any of a plurality of automobile models. Even more specifically, the invention is related to such universal mats wherein the mats are trimmable to allow customized shaping according to the intended model.

BACKGROUND

Mats employing a plurality of differently-shaped guidelines to assist the purchaser to trim the mat to a shape appropriate for a specific model are well known. Such mats are exemplified in the teachings of U.S. Pat. Nos. 8,080,302, 8,277,918, 8,455,078, 8,685,516, 8,778,480, and publication 2003/0143358.

Such "universal" floor mats are intended to provide adaptability to a wide array of automobile models. The retailer needs to only carry one Stock Keeping Unit (SKU) to serve many vehicles, thereby simplifying inventory and minimizing required retail space. The mats include trimmable outlines, each of which is intended to allow the user to cut into a shape that will fit into the desired automobile model. These trimmable outlines are typically thinned grooves that simplify cutting. The end user is instructed to select those lines that will result in a mat shape that most closely mimics the shape of the mat provided originally by the automobile manufacturer ("OEM" mat), and cut along the selected outline with a knife or scissors to create a "custom fit" mat for his/her vehicle.

Such previous trimmable mats included a maze of confusing similarly-contoured side-by-side and criss-crossing trim lines that were difficult for many users to distinguish. This resulted in the users oftentimes cutting the mat into the wrong shape. And such systems typically result in a mat that only approximates the OEM mat. For instance, one outline would be meant for use for two vehicles having approximately, but not exactly, the same size and shape, because the myriad of cuttable lines would otherwise be overly crowded and would cause further confusion. These problems have caused much user dissatisfaction and many product returns to the retailers. Such user dissatisfaction is generally directed towards and such returns are usually sent back to the mat manufacturers. Obviously, this all poses problems, not limited to such end user confusion and dissatisfaction and such manufacturer returns.

Accordingly, there is a need and it is an object of the invention, to provide a customizable automobile mat system that is less confusing and easier to use by the consumer. There is also a need, and it is also an object of the invention, to provide a customizable automobile mat system that is less prone to being returned to the manufacturer as defective. There is also a need, and it is also an object of the invention, to provide a customizable automobile mat system that results in mats more closely approximating each vehicles OEM mats.

Further needs and objects exist which are addressed by the present invention will become apparent by the included disclosure of an exemplary embodiment thereof.

SUMMARY OF THE INVENTION

The invention may be embodied in or practiced using mats which have a plurality of simple-to-follow color-coded trim lines, and which are packaged with a color-coded chart of a similar plurality of various automobile models. The user simply selects the color associated with his or her vehicle, and then cuts along the trim line of that color. Where one line or a portion of a line serves more than one outline, the colors are made still recognizable by using "dashed" lines that can be interposed as herein demonstrated.

The lines may be made by embossing, debossing, stamping, over-molding, printing, painting, embroidering, burnishing, heat-transferring, projection, etching the lines directly into a tool used to mold the mat, silk screening, or by any other known manner.

Alternatively, the lines could be formed by insert-molding a number of differently-colored wires, threads, or strings into the mat, then the user would simply pull on the string of the correct color and that string would peel from the mat leaving the mat weakened along that outline so that the exterior of the outline could be simply torn away from the desireable middle portion.

The present invention may be exemplified or practiced using an automobile mat having a plurality of differently colored guidelines applied to one of both of a top surface and a bottom surface thereof, each to aid in the cutting therealong to create a mat periphery shaped and sized to properly fit one of a similar plurality of vehicle models.

The mat may be made of a material from the group including carpet, vinyl, plastic, rubber, and any combination thereof. The colored guidelines may be applied to the mat by one or more process from the group including embossing, debossing, stamping, over-molding, printing, painting, embroidering, burnishing, heat-transferring, projection, the application of colored strings embedded into the structure of the mat following the cut lines which once removed will allow the tearing away of material superfluous to the mat periphery, etching the lines directly into a mold used to mold form mat, and any combination thereof.

The guidelines may be at least partially of alternating dashes and spaces. The one or more of the guidelines may partially overlie another one or more of the guidelines in an overlying zone, and within that overlying zone, the guidelines may be of the dashes and spaces and the dashes and spaces of each line in the overlying zone may be alternated.

The top surface may have grooves to collect inadvertently spilled liquids, i.e., liquid collecting grooves, and ridges to prevent a user's shoes and pants from being wetted within the collected liquids. The ridges may include annular ridges, each aligned with and having a shape and size equal to one of the guidelines.

The present invention may alternatively be exemplified or practiced using a floor mat having a plurality of differently colored guidelines applied to one of both of a top surface and a bottom surface thereof, each to aid in the cutting therealong to create a differently shaped and sized mat periphery.

Further features and aspects of the invention are disclosed with more specificity in the detailed description and drawings provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

The patent or application file contains at least one drawing executed in color. Copies of this patent or patent application publication with color drawing(s) will be provided by the Office upon request and payment of the necessary fee.

Figure 1:
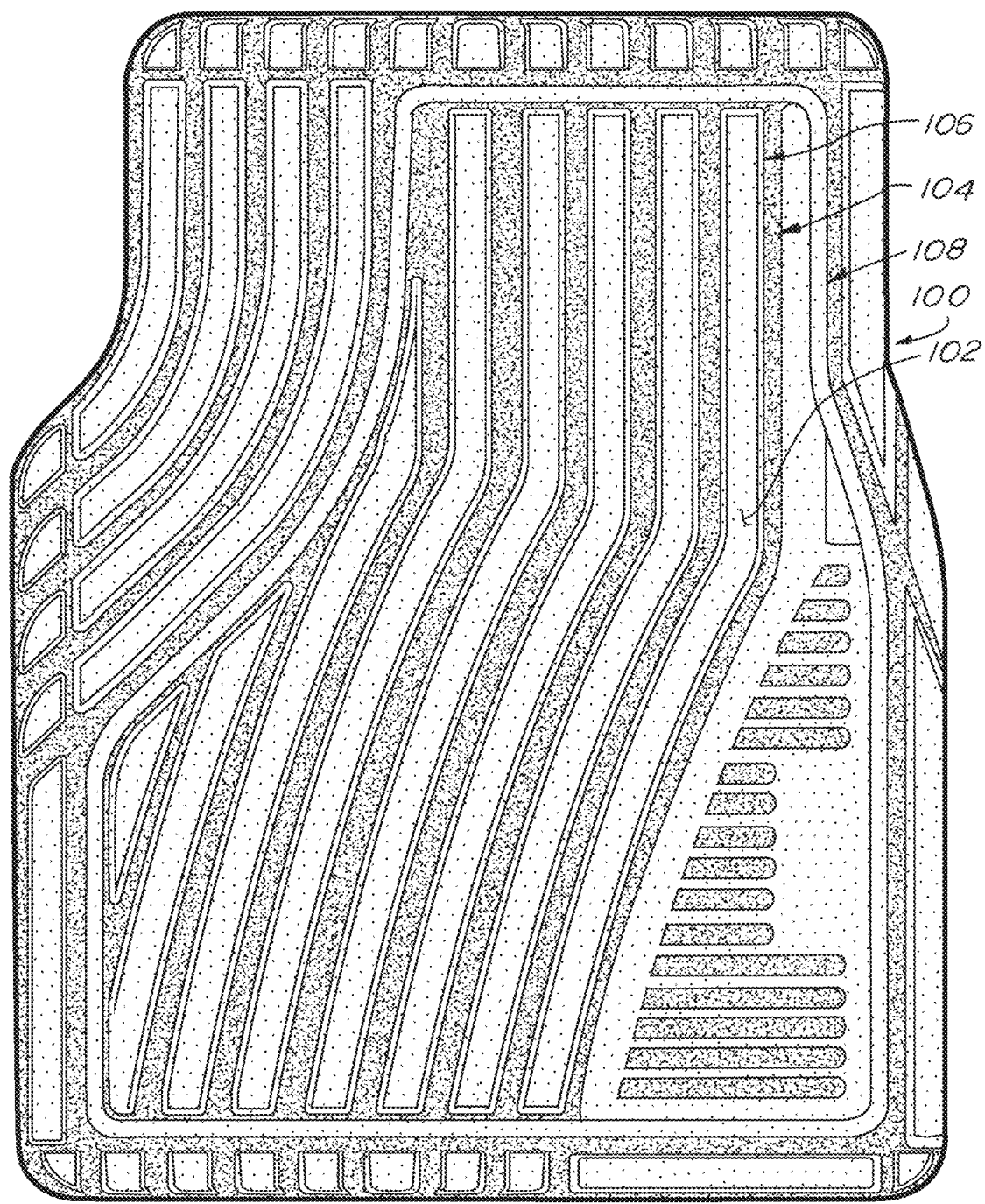
Figure 2:
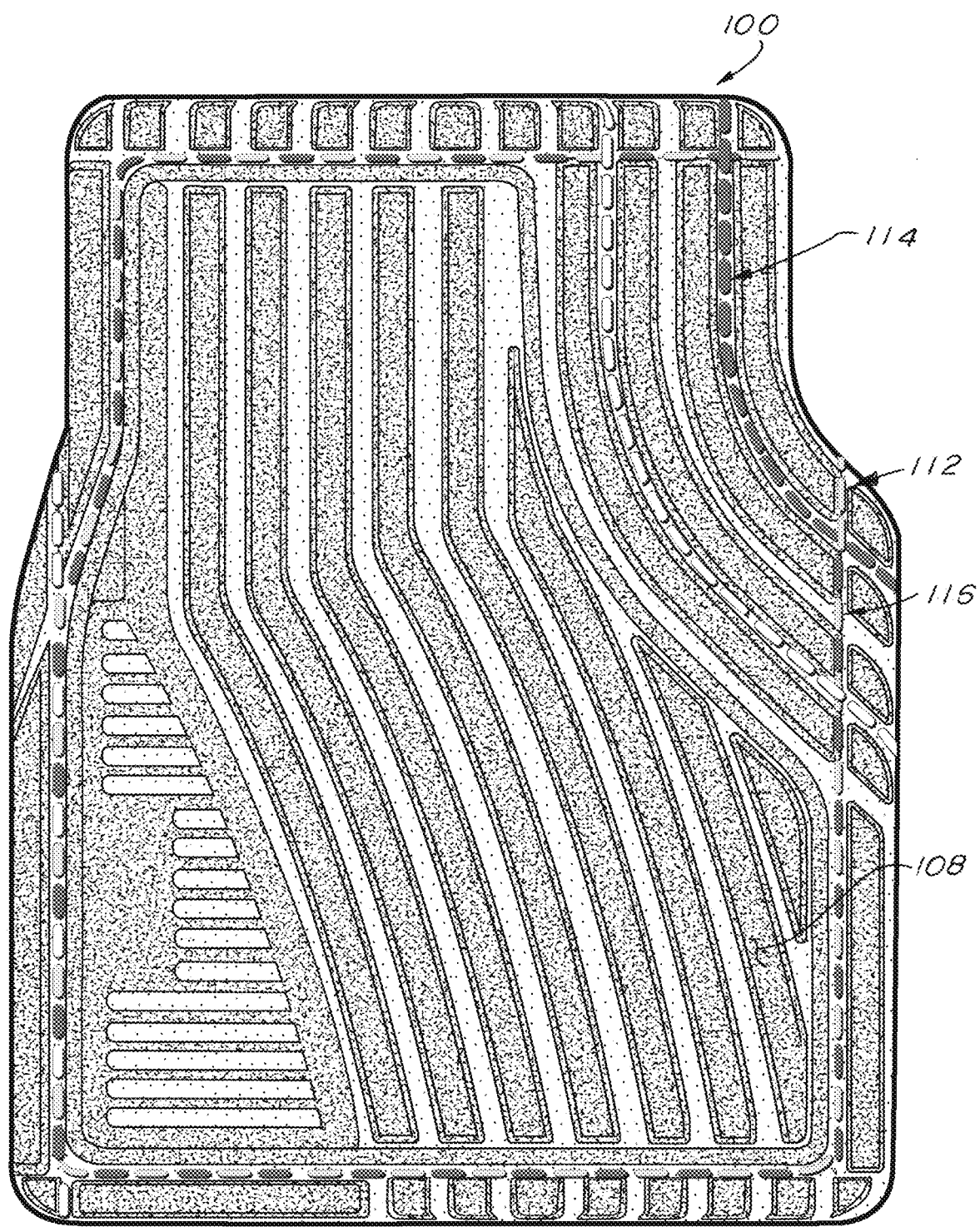
Figure 3:
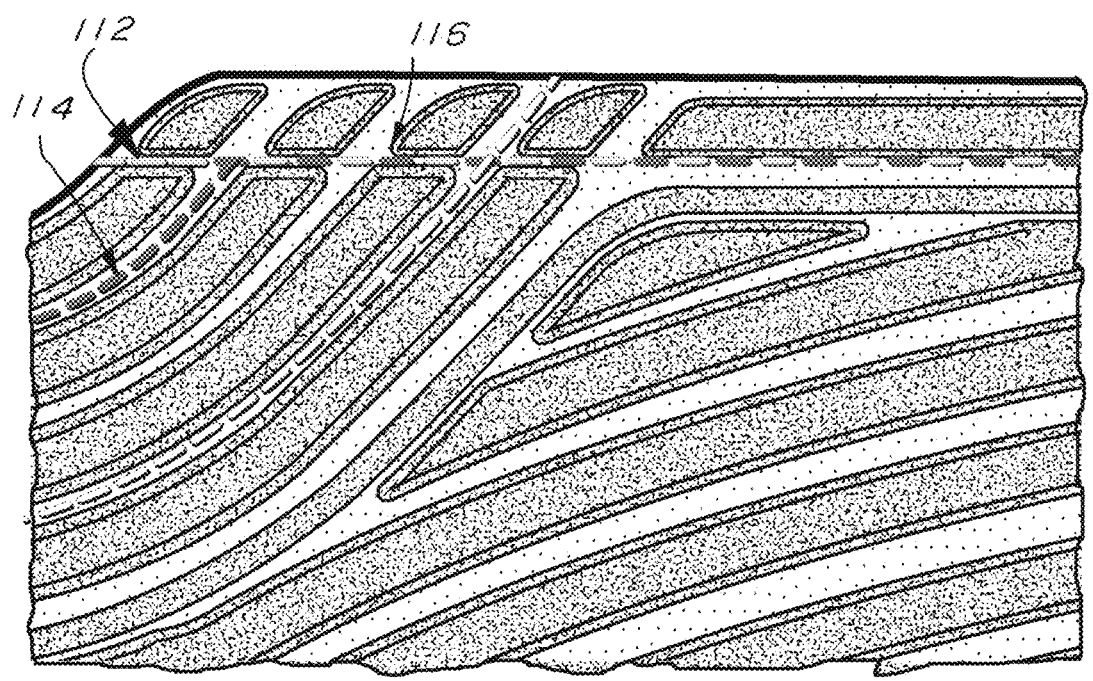
Figure 4:
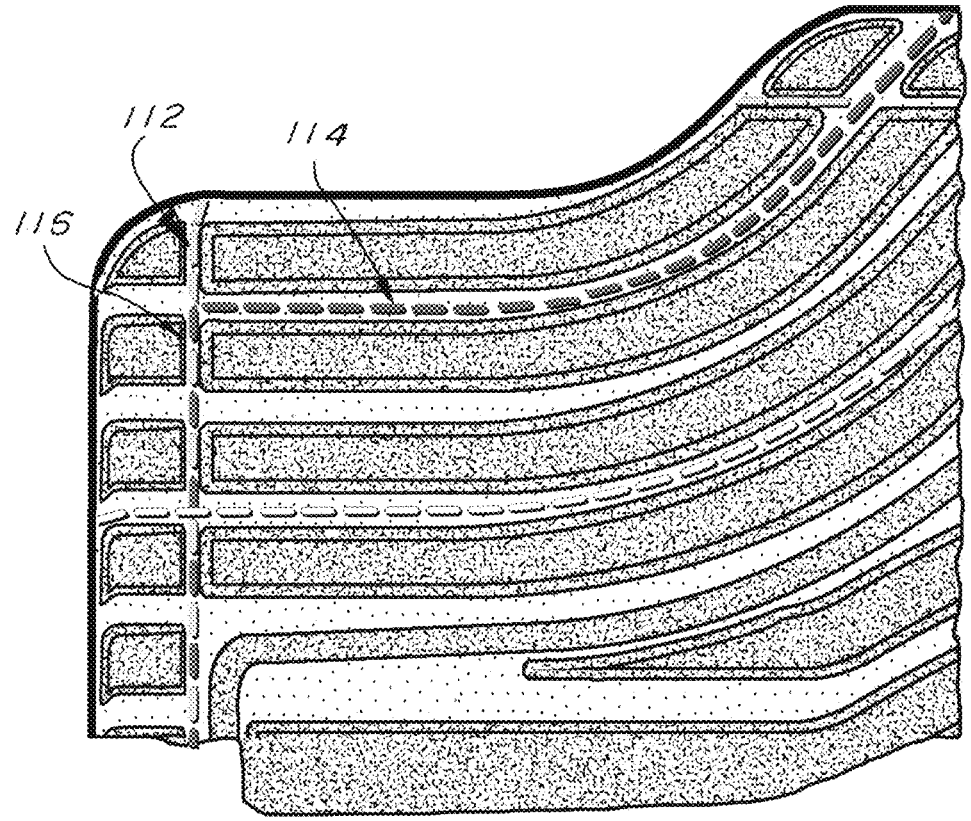
Figure 5:
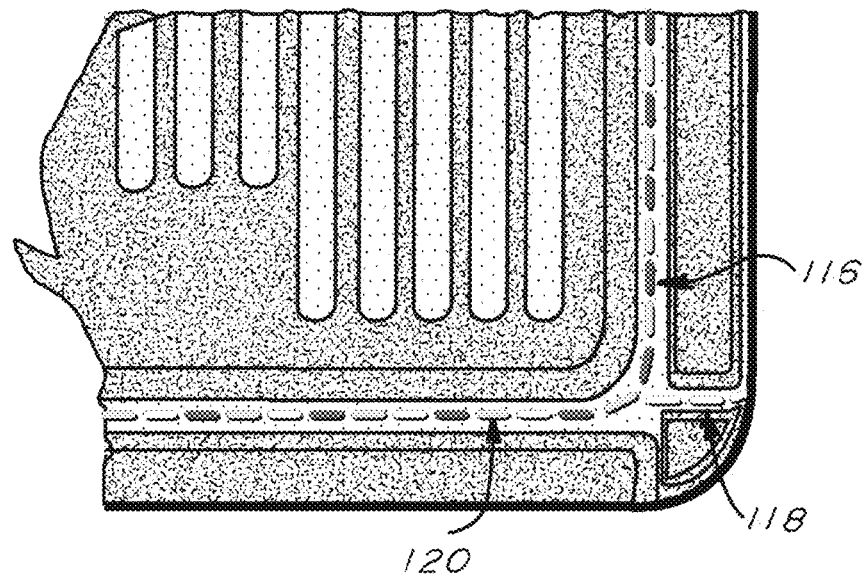
Figure 6:
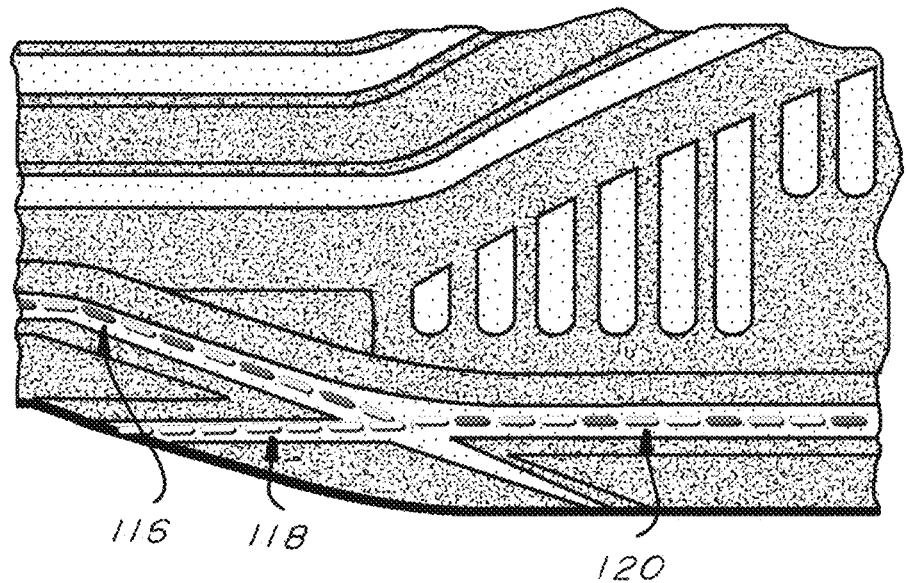
Figure 7:
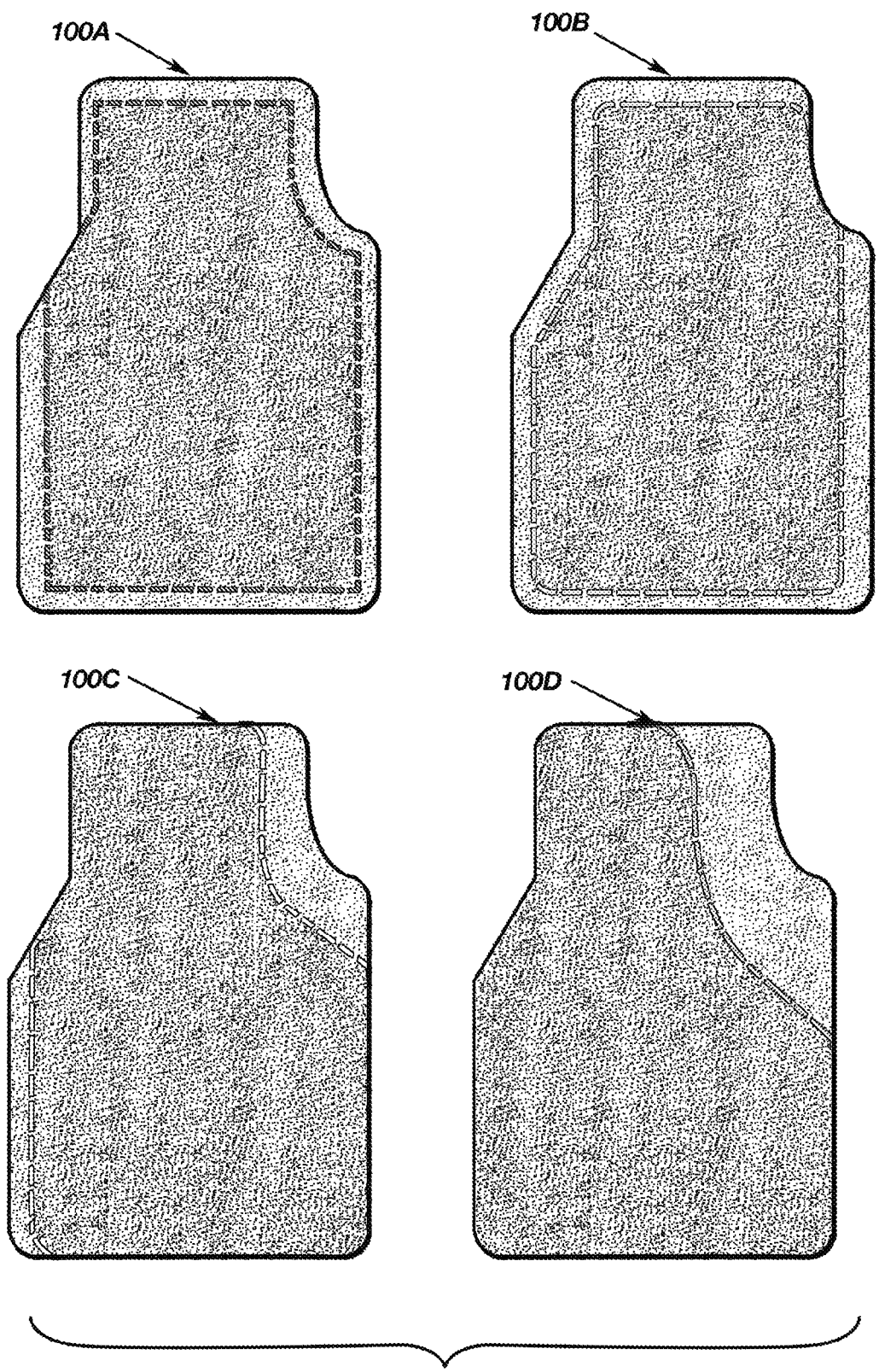
Figure 8:
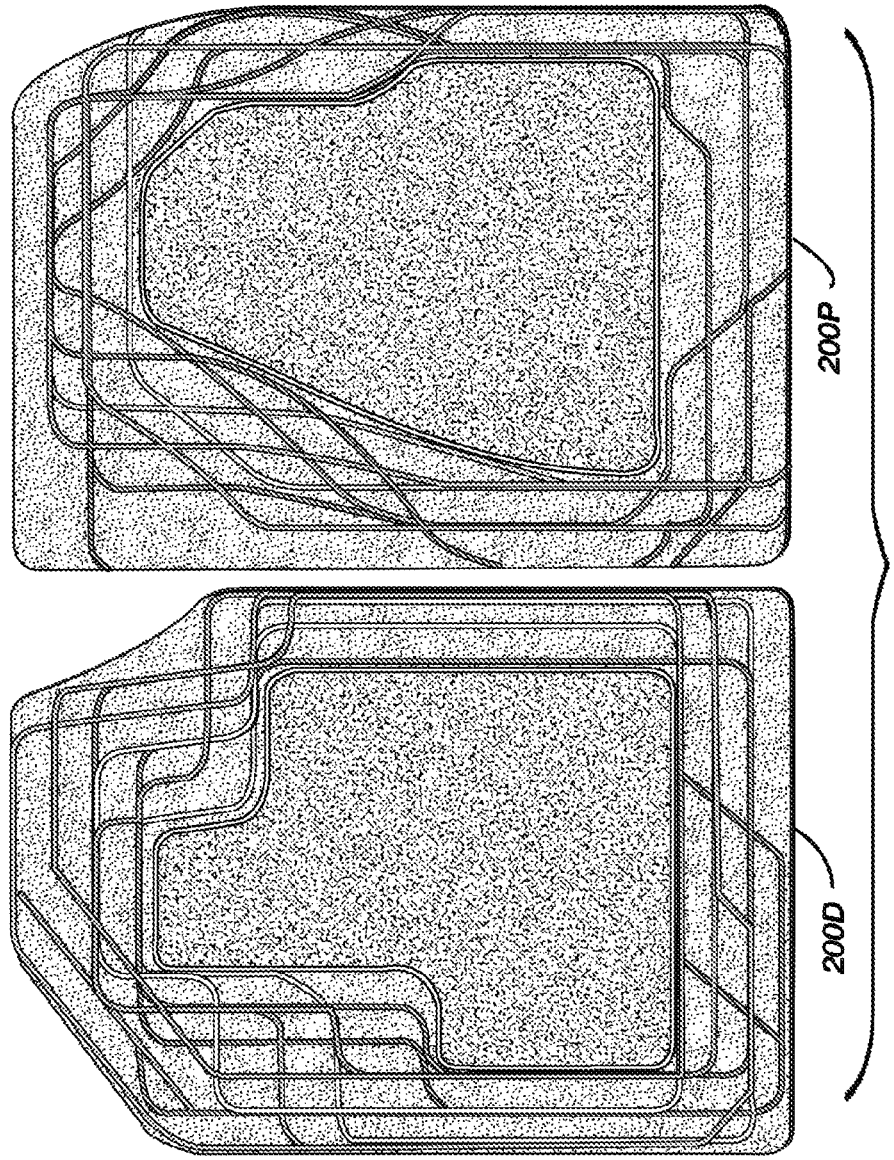
Figure 9C:
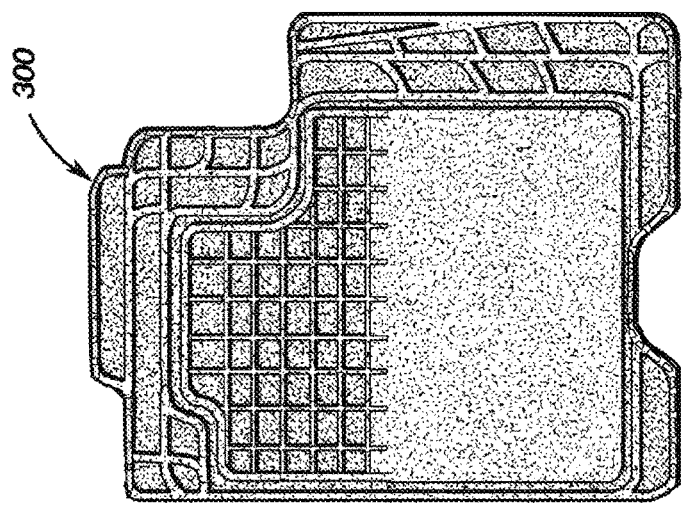
Figure 9B:
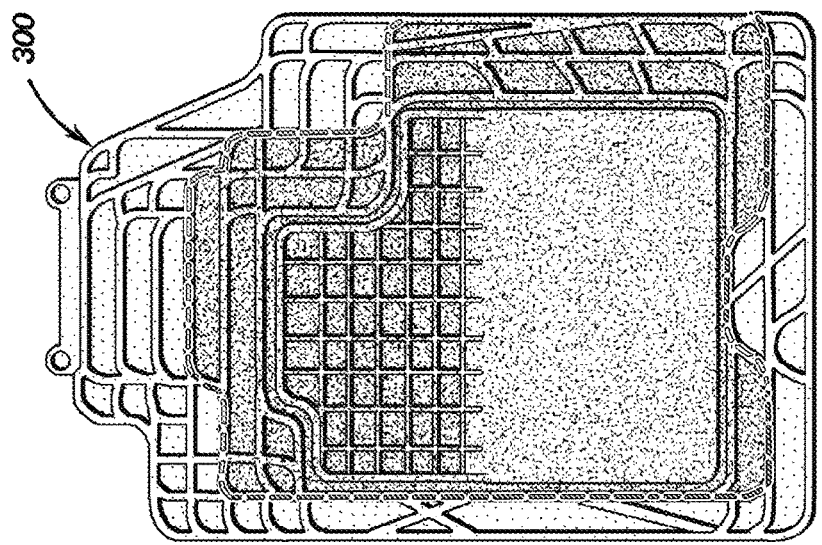
Figure 9A:
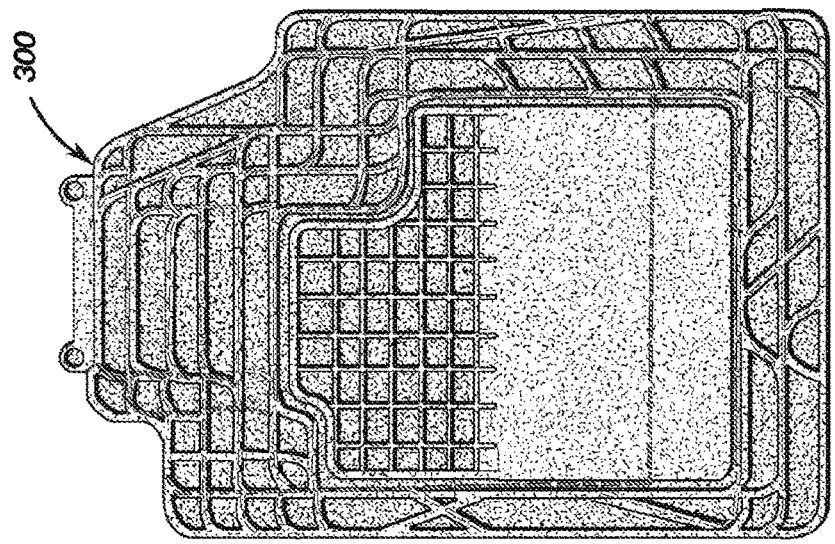

This patent or application file contains the following drawings:

FIG. 1 is a top view of an as-bought vehicle floor mat in accordance with a first exemplary embodiment;

FIG. 2 is a bottom view of the mat of FIG. 1;

FIG. 3 is a first close-up bottom view of a portion of the mat of FIG. 1;

FIG. 4 is a second close-up bottom view of a portion of the mat of FIG. 1;

FIG. 5 is a third close-up bottom view of a portion of the mat of FIG. 1;

FIG. 6 is a fourth close-up bottom view of a portion of the mat of FIG. 1;

FIG. 7 is an array of plan views showing four customized mats producible from the mat of FIG. 1;

FIG. 8 is a bottom view of an as-bought vehicle floor mat in accordance with a second exemplary embodiment with a list of the vehicle models available for customization;

FIG. 9A is a bottom view of an as-bought vehicle floor mat in accordance with a third exemplary embodiment;

FIG. 9B is a bottom view of the mat of FIG. 9A with the to-be-trimmed waste material ghosted; and FIG. 9C is a bottom view of the mat of FIG. 9A with the waste material removed.

DETAILED DESCRIPTION OF EXEMPLARY EMBODIMENTS

Referring first to FIGS. 1 through 7, there is shown an exemplary mat 100 in accordance with or useful in practicing the invention. The mat is preferably made of injection-molded PVC. The top surface 102 of the mat, as seen in FIG. 1, has grooves 104 and ridges 106 which are intended to, respectively, channel spilled liquids and support the users shoes and pant-cuffs above the spilled liquid. The ridges may also include annular ridges 108 which have the same shape and size and are aligned with the outlines on the underside along which the mats will be trimmed when customized. In this way, grooves are not left open ended by trimming the mat along a guideline of a particular color as described herein, and the trimmed mats will have peripheral border ridges 108 that allow it to have a more "finished" appearance.

The bottom surface 110 of the mat is best seen in FIG. 2, where variously colored "dashed" outlines, alternatively referred to herein as colored guidelines, which indicate the various trimmed mat shapes which fit various vehicle models. Each of these dashed outlines is of a different color. The consumer may refer to an included color-coded chart (see FIG. 8 as an example), to know which colored guideline applies to his/her vehicle model. Thus, trimming the mat along a guideline of a particular color will cause the shape of the mat to be modified to fit the vehicle model to which that particular color corresponds on the color coded chart.

Referring to FIGS. 3 through 6, close-up views are provided of several portions of the bottom surface to show the dashed lines in better detail and to show how the use of dashed lines allows an overlapping of lines of different colors while still allowing the desired line to be maintained without confusion. For instance, in FIGS. 3 and 4, a yellow dashed line 112 joins a red dashed line 114 to become a 2-color line 116 that alternates yellow and red. And in FIGS. 5 and 6, a white dashed line 118 joins the 2-color yellow/red line 116 to become a 3-color line 120 that alternates yellow, red, and white. This enables the same line to simultaneously function for any number of outlines. And of course, the dashes could be replaced by "dots" or by any other equivalent marking to form a broken line, all of which are included in the term "dashed line" as used herein.

FIG. 7 shows four differently-shaped mats 110A through 100D, intended to serve four different vehicle models, that have been trimmed from the as-purchased mat of FIGS. 1 through 6.

Manufacturing of the mats employs a novel process. After removal from the molding press, the mat is placed bottom-side-up under a printer and onto a table, into jigs which support it and keep its bottom surface level and flat. The printer is similar to a large ink jet printer. A printing head moves back and forth over the table and prints a white line, then each colored line, sequentially, to create the plurality of outlines required. Then the mat is placed into a low temp oven which cures the printed ink and bonds it to the mat surface and makes it impervious to smearing, smudging, etc.

FIG. 8 shows a pair of as-bought mats 200D and 200P according to a second embodiment, along with a color-coded chart 202 that lists the vehicle models for which mats may be created by cutting along the guideline of the selected color.

FIGS. 9A through 9C are a series of views of a mat 300 according to a third embodiment. Its as-bought configuration is shown in FIG. 9A. The waste portion to be trimmed away is ghosted in FIG. 9B, And the final configuration for use in the intended vehicle is shown in FIG. 9C.

Alternatively, aspects of the invention remain if the lines are embossed, debossed, stamped, over-molded, painted, embroidered, burnished, heat-transferred, or projected, or if the lines are etched directly into the mold, silk screened, or by any other known manner.

The basic single-color line consists of dashes and spaces of equal length. Multi-colored lines have spaces between dashes according to the number of conjoined colored lines . . . color 1, space, color 1, space, etc. If two differently colored lines are overlapped over a stretch, each will have one space between dashes and they will be overlapped so that within that stretch the dashes of one color land in the spaces of the other . . . color 1, color 2, color 1, color 2, etc. If three differently colored lines are overlapped over a stretch, each will have two spaces between dashes and will be overlapped so that that each color repeats every third dash . . . color 1, color 2, color 3, color 1, color 2, color 3, etc. In this way there are no spaces left after printing in those stretches where different colored lines run together. So it can be appreciated that the number of spaces between dashes of each color within that combined stretch is equal to the number of colors in that stretch minus one.

Alternatively, in a second anticipated embodiment, the basic single-color line could consist of a solid line. In a third anticipated embodiment, the basic single colored line could consist of dashes and spaces of equal length, but the multi-colored lines could have spaces between dashes equal to the number of conjoined colored lines. In this case, if two differently colored lines are overlapped over a stretch, each will have two spaces between dashes and they will be overlapped so that within that stretch the dashes of one color, the next color, and a dash are alternated . . . color 1, color 2, space, color 1, color 2, space, etc. If three differently colored lines are overlapped over a stretch, each will have three spaces between dashes and will be overlapped so that that each color repeats; color 1, color 2, color 3, dash color 1, color 2, color 3, dash. etc. In this way there are spaces left after printing in those stretches where different colored lines run together.

Software instructs the printer where to print each colored line with one space between dashes and where to print with more than one.

It should be noted that the embodiment shown herein is not intended to limit the scope of the invention. The invention therefore only be limited by the follow claims, including any equivalent interpretation to which they are entitled.

I claim:

1. A customizable vehicle floor mat system comprising:
a color coded chart listing a plurality of different vehicle models and a color for each listed vehicle model; and
an automotive floor mat having a top surface which comprises a plurality of ridges and a plurality of liquid collecting grooves, a bottom surface and a plurality of differently colored guidelines, the colors of the guidelines being the same as colors on the color coded chart;
wherein the colored guidelines are located such that trimming the mat along a guideline of a particular color will cause the shape of the mat to be modified to fit the vehicle model to which that particular color corresponds on the color coded chart; and
wherein the colored guidelines are also located relative to the liquid collecting grooves such that trimming the mat along any one of the colored guidelines will not cause any of the grooves to become open ended.

2. The system of claim 1 wherein the mat is made of a material from the group including carpet, vinyl, plastic, rubber, and any combination thereof.

3. The system of claim 1 wherein the colored guidelines are applied to the mat by one or more process from the group including embossing, debossing, stamping, over-molding, printing, painting, embroidering, burnishing, heat-transferring, projection, embedding of colored strings into the mat to enable tearing of the mat periphery, transference of the guidelines onto the mat from a mold surface during molding of the mat, and any combination thereof.

4. The system of claim 1 wherein the guidelines are comprised at least partially of spaced apart colored dashes.

5. The system of claim 4 wherein one or more of the guidelines partially overlies another one or more of the guidelines in an overlying zone, and wherein, within that overlying zone, the overlying guidelines comprise spaced apart dashes of alternating colors.

6. The system of claim 1 wherein the ridges comprise annular ridges, and wherein the guidelines are aligned with ridges.

7. A floor mat having a plurality of differently colored guidelines applied to one or both of a top surface and a bottom surface thereof, each of the differently colored guidelines being configured to aid in the cutting there-along to create a differently shaped and sized mat periphery, wherein the top surface has liquid collecting grooves formed therein and wherein the differently colored guidelines are located relative to the liquid collecting grooves such that cutting along any one of the differently colored guidelines will not cause any of the liquid collecting grooves to become open ended.

8. The floor mat of claim 7 wherein the mat is made of a material from the group including carpet, vinyl, plastic, rubber, and any combination thereof.

9. The floor mat of claim 8 wherein the colored guidelines are applied to the mat by one or more process from the group including embossing, debossing, stamping, over-molding, printing, painting, embroidering, burnishing, heat-transferring, projection, embedding of colored strings into the mat to enable tearing of the mat periphery, transference of the guidelines onto the mat from a mold surface during molding of the mat, and any combination thereof.

10. The floor mat of claim 9 wherein the guidelines are comprised at least partially of spaced apart colored dashes.

11. The floor mat of claim 10 wherein one or more of the guidelines partially overlies another one or more of the guidelines in an overlying zone, and wherein, within that overlying zone, the overlying guidelines comprise spaced apart dashes of alternating colors.

12. The floor mat of claim 7 wherein top surface further comprises raised ridges.

13. The floor mat of claim 12 wherein the ridges comprise annular ridges, each of which is aligned with and runs adjacent to one of the guidelines.

* * * * *